(No Model.)
W. MACKEY.
SAFETY LINE AND REELING ATTACHMENT.
No. 267,909. Patented Nov. 21, 1882.
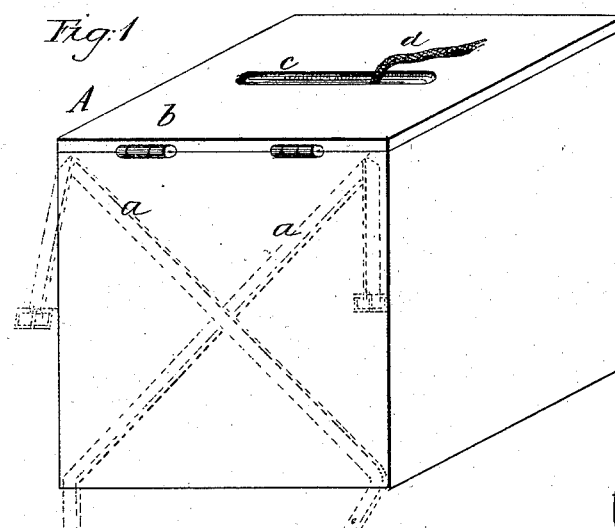
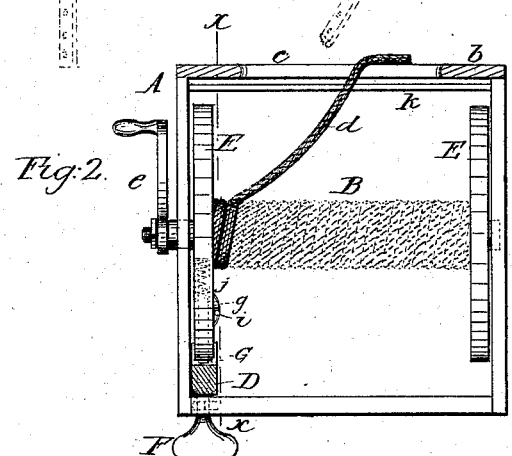
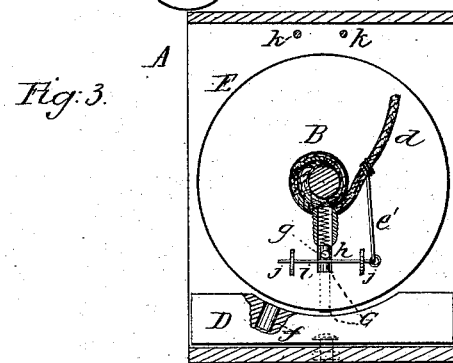
WITNESSES:
INVENTOR
William Mackey
BY W. C. Donn
ATTORNEYS

UNITED STATES PATENT OFFICE.

WILLIAM MACKEY, OF BROOKLYN, NEW YORK.

SAFETY-LINE AND REELING ATTACHMENT.

SPECIFICATION forming part of Letters Patent No. 267,909, dated November 21, 1882.

Application filed July 25, 1882. (No model.)

*To all whom it may concern:*

Be it known that I, WILLIAM MACKEY, a citizen of the United States, residing at Brooklyn, in the county of Kings and State of New York, have invented a new and useful Safety-Line and Reeling Attachment for the same, of which the following is a specification.

The object of my invention is to provide a safety-line, for painters and others working on scaffolding, so arranged that the supply of rope for lengthening the line is carried on the person, and the apparatus for reeling and unreeling the line is arranged so that the slack can be increased or diminished at will by the workman, and in case of the scaffold breaking or the workman falling the unreeling of the rope is checked automatically before reaching the ground.

The invention consists of an apparatus for reeling the safety-line, adapted to be attached to the back of the workman, and provided with a device for quickly and easily regulating the reel for coiling or uncoiling the line, and also adapted to check the motion of the reel when the line is run out by the workman in falling, the said apparatus being also provided with a device for automatically stopping the reel and the uncoiling of the rope before enough of the rope has run out to permit the apparatus to reach the ground.

In the accompanying drawings, Figure 1 represents a perspective view of my invention. Fig. 2 represents a sectional elevation of the same. Fig. 3 is a section of the apparatus, taken on line $x\,x$ of Fig. 2. Fig. 4 illustrates the manner of using the safety-line and the reeling attachment.

Referring to the drawings, A represents a box or case, made of wood or other suitable material, and of a convenient size and shape for attaching to the back of a person, for which purpose it should be provided with suitable straps, *a*. The box or case has a hinged lid or cover, *b*, provided with a slot, *c*, for the rope *d* to pass through. Inside the box or case is placed a reel, B, on a shaft which has suitable bearings in the sides of the case. One end of the shaft may be extended through the side, and provided with a fixed or removable crank, *e*, for winding the said reel.

D represents a brake which is placed in the case under or next to one of the wheels E of the reel, in such a position that it can be moved in contact with the periphery of said wheel for the purpose of checking the motion of the reel. The said brake is connected with a thumb-screw, F, which projects through the case, so that the brake can be operated without opening the case. One of the brakes D may be applied to each of the wheels E, if desired.

In the wheel E, next to the brake, is socketed a spring-bolt, G, with its end in position to project out of the periphery of said wheel, as shown. In the concave face of the brake is a socket, *f*, so placed that when the bolt is released it will enter the said socket when by the revolution of the wheel it is brought in line with the socket. To hold the bolt in the socket when it is not required to stop the rotation of the reel, it is provided with a stud, *g*, which projects through a slot, *h*, in the face of the wheel, and bears on a pin, *i*, held in place by staples *j j*. By these devices the bolt is retained in the socket and prevented from stopping the reel by entering the socket *f*; but when it is desired to stop the reel after a certain part of the rope is uncoiled the bolt is released automatically by the following arrangement: The pin *i* is connected by a piece of wire or other suitable material, *e'*, with the rope wound on the reel at such a point on the rope that when the rope unwinds from the reel, and that part to which the wire is attached is reached, the apparatus carrying the reel and the person to whom the apparatus is attached will be clear of the ground. When the said point on the unwinding rope is reached and leaves the reel it draws the pin *i* out from the staples as soon as the said pin is carried by the turning of the wheel to a position about parallel to the unwound part of the line, and thereby releases the bolt, which shoots out of the socket, and when brought by the revolution of the reel in line with the socket *f* it enters the same, stops the reel, and thereby prevents the further unwinding of the rope. The free end of the safety-line is attached to the cornice or other convenient part of the building above the scaffolding, and the apparatus is attached to the back of the workman, who unreels sufficient to permit him to move without restraint. The brake is pressed against the wheel to keep the line from unwinding. As the scaffold is lowered the brake is released to allow more slack to run out, and then tightened again. If the scaffold breaks or the workman falls, so that his whole weight falls on the safety-line which supports him, the line is permitted to run off the reel with more or less speed; but before reaching the ground the rope or line draws out the pin $i$, releasing the bolt, which shoots out, and, entering the socket $f$, stops the reel, and thereby prevents the workman from being injured by being violently precipitated to the ground.

The rods $k\ k$ serve as guides for the line.

The line and apparatus may be used as a fire-escape.

I claim—

1. The case A for safety-lines, adapted to be attached to the person, in combination with the reel B, brake D, and spring-bolt G, arranged to automatically stop the reel and the unwinding of the line, substantially as specified.

2. In a reeling attachment for safety-lines, the brake D, provided with the socket $f$, the wheel E, provided with the spring-bolt G, having a stud, $g$, projecting through a slot in the said wheel, in combination with the pin $i$, connected with the rope $d$, so that when the rope runs out the reel is automatically stopped by the bolt G, in the manner substantially as described.

WILLIAM MACKEY.

Witnesses:
C. W. RICHTER,
P. UMSTATER.